United States Patent [19]

Pri-Tal

[11] Patent Number: 4,622,669
[45] Date of Patent: Nov. 11, 1986

[54] TEST MODULE FOR ASYNCHRONOUS BUS

[75] Inventor: Shlomo Pri-Tal, Phoenix, Ariz.

[73] Assignee: Motorola, Inc., Schaumburg, Ill.

[21] Appl. No.: 708,093

[22] Filed: Mar. 4, 1985

Related U.S. Application Data

[63] Continuation of Ser. No. 464,305, Feb. 7, 1983, abandoned.

[51] Int. Cl.$^4$ .................................... G01R 31/28
[52] U.S. Cl. ................................ 371/25; 371/20; 364/200
[58] Field of Search ........................ 371/16, 25, 20; 364/200, 900

[56] References Cited

U.S. PATENT DOCUMENTS

| | | | |
|---|---|---|---|
| 3,573,751 | 4/1971 | DeLisle | 371/25 X |
| 3,898,621 | 8/1975 | Zelinski et al. | 371/25 X |
| 3,931,505 | 1/1976 | Sevcik | 371/68 |
| 4,049,957 | 9/1977 | Kera et al. | 371/68 X |
| 4,183,459 | 1/1980 | Donn et al. | 371/25 X |
| 4,312,066 | 1/1982 | Bantz et al. | 371/16 |
| 4,317,199 | 2/1982 | Winslow | 371/16 |

OTHER PUBLICATIONS

Stark, G. M., "LSI Module Test Probe," IBM Technical Disclosure Bulletin, vol. 21, No. 10, pp. 4157-4158.
Bissinger, W. R. et al., "Error Trapping in Test Equipment," IBM Technical Disclosure Bulletin, vol. 22, No. 1, pp. 224-226.

Primary Examiner—James D. Thomas
Assistant Examiner—David L. Clark
Attorney, Agent, or Firm—William E. Koch

[57] ABSTRACT

A test module is provided for troubleshooting and diagnosing hardware failures in the interface logic to an asynchronous microprocessor bus at true operating speed until a fault occurs. If a fault is detected, the circuit will halt a microprocessor under test coupled to the asynchronous microprocessor bus and freeze the state of the bus signal lines. The microprocessor under test has bit pattern sets therein. A test microprocessor has test pattern sets stored in internal memory. Test pattern latches are coupled to the test microprocessor for sequentially latching the test pattern sets. Address bus latches and data bus latchs are coupled to the asynchronous bus for latching the state of the address lines as a pattern under test. A comparator is coupled to the asynchronous bus, the test microprocessor, the first means, and the second means, for comparing one of the bit patterns to one of the test patterns wherein a continue signal is supplied to the asynchronous bus and the test microprocessor when the test pattern and the bit pattern are the same so that another of the test patterns and another of the bit patterns may be compared. A diagnose signal is supplied to the test microprocessor when the test pattern and the bit pattern are not the same. Fault latches are coupled to the address bus latches and data bus latches, the test microprocessor, and the asynchronous bus, for outputting the bit pattern when the diagnose signal is generated.

6 Claims, 1 Drawing Figure

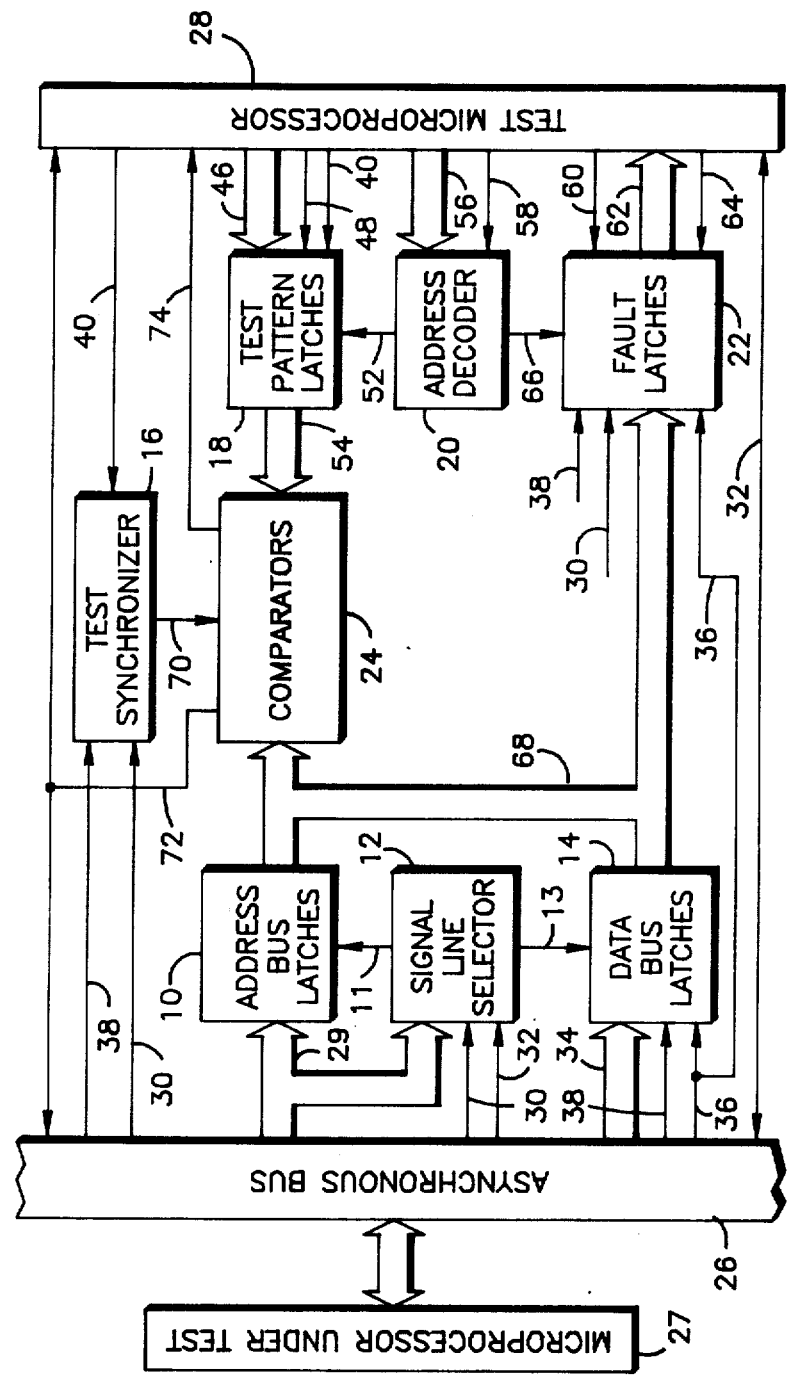

TEST MODULE FOR ASYNCHRONOUS BUS

This application is a continuation, of application Ser. No. 464,305, filed Feb. 7, 1983, now abandoned.

BACKGROUND OF THE INVENTION

1. Field of the Invention

This invention relates to a circuit for troubleshooting and diagnosing an asynchronous microprocessor bus.

2. Background Art

The asynchronous bus protocol defines an environment where new bus operations start only after an acknowledgment for the completion of the previous operation is received. This protocol defines that all bus signals that participate in the current operation must remain valid for the duration of the operation, and are negated only after the operation is acknowledged. As related to bus protocols, the operation performed on the bus is usually termed a bus cycle.

The cycle can complete successfully or unsuccessfully, wherein one of two signals will be asserted to acknowledge the cycle. An acknowledge (ACK) signal will be asserted to signal a successful cycle, while a not acknowledge (NAK) signal will be asserted to signal an unsuccessful cycle. ACK an NAK signals are mutually exclusive, and until one is received, all bus signals that participate in the bus cycle remain asserted.

When a bus cycle is acknowledged with either an ACK or NAK signal, the microprocessor completes its bus access operation, and negates all bus signals that participated in the bus cycle.

Comparing pairs of data to determine the validity of data paths is a well known method for testing computer systems. This previously known method for testing bus interfaces at true operating speed is executed by performing data transfers to a memory device over the bus, reading it back from the memory device, and then comparing the two sets of data. The transfers are performed by executing test routines that reside on the device under test, which include a microprocessor and the asynchronous bus interface logic. The testing of the device under test in a system environment was actually performed by the device under test itself, comparing written data to read data. Thus, each comparison included two distinct bus cycles: a write cycle and a read cycle.

During a write cycle, the computer selected a memory device by placing its address on the addressing lines of the bus, and then sending a data pattern over the bus and writing it to the memory device. During the read cycle, the same device was re-selected, and the data it contained was read. After the read cycle was complete, the data read was verified to be identical to the test pattern that was sent over the bus.

However, since the validity of the write cycle was not verified until after the read cycle was completed, a faulty signal for that cycle would have been removed from the bus. Thus, when trying to fix the device, the failure has to be repeated, which was not easy, required additional test procedures, and consumed a fair amount of time. Even after the fault was duplicated, no means were available to freeze the state of the signal lines to a static level, so that scoping would be possible. Furthermore, quality assurance was suspect because even when malfunctioning, the device under test was the major part of the test apparatus, both controlling the test sequence and determining the validity of the test.

Thus, what is needed is a test module for troubleshooting and diagnosing an asynchronous microprocessor bus that reduces troubleshooting time and cost, while providing for a more comprehensive test in a system environment and at true operating speed.

SUMMARY OF THE INVENTION

Accordingly, it is an object of the present invention to provide a test module for troubleshooting and diagnosing an asynchronous microprocessor bus.

Another object of the present invention is to provide a test module for troubleshooting and diagnosing an asynchronous microprocessor bus in a static manner when a fault is detected.

Yet another object of the present invention is to provide a test module for troubleshooting and diagnosing an asynchronous microprocessor bus at true operating speed until a fault occurs.

Another object of the present invention is to provide a test module for troubleshooting and diagnosing an asynchronous microprocessor bus having a reduced troubleshooting and diagnosing time.

Still another object of the present invention is to provide a test module for troubleshooting and diagnosing an asynchronous microprocessor bus wherein the device under test neither controls nor affects the test sequence.

Another object of the present invention is to provide a test module for troubleshooting and diagnosing an asynchronous microprocessor bus wherein the device under test does not determine the validity of the test.

Yet another object of the present invention is to provide a test module for troubleshooting and diagnosing an asynchronous microprocessor bus wherein the validity of each transfer is verified before the transfer is allowed to be completed.

Still another object of the present invention is to provide a test module for troubleshooting and diagnosing an asynchronous microprocessor bus wherein the address bus is tested in an isolated manner.

In carrying out the above and other objects of the present invention in one form there is provided a test module for troubleshooting and diagnosing an asynchronous bus. If a fault is detected, the circuit will halt a microprocessor under test coupled to the asynchronous microprocessor bus and freeze the state of the bus signal lines. The microprocessor under test has bit pattern sets therein. A test microprocessor has test pattern sets stored in internal memory. Test pattern latches are coupled to the test microprocessor for sequentially latching the test pattern sets. Address bus latches and data bus latches are coupled to the asynchronous bus for latching the state of the address lines as a pattern under test. A comparator is coupled to the asynchronous bus, the test microprocessor, the first means, and the second means, for comparing one of the bit patterns to one of the test patterns wherein a continue signal is supplied to the asynchronous bus and the test microprocessor when the test pattern and the bit pattern are the same so that another of the test patterns and another of the bit patterns may be compared. A diagnose signal is supplied to the test microprocessor when the test pattern and the bit pattern are not the same. Fault latches are coupled to the address bus latches and data latches, the test microprocessor, and the asynchronous, but for outputting the bit pattern when the diagnose signal is generated.

The above and other objects, features, and advantages of the present invention will be better understood from the following detailed description taken in conjunction with the accompanying drawing.

BRIEF DESCRIPTION OF THE DRAWING

The single FIGURE is a block diagram of a preferred embodiment of the present invention.

DETAILED DESCRIPTION OF THE INVENTION

Referring to the single FIGURE, the test module of the present invention is shown which is suitable to be fabricated in monolithic integrated circuit form and includes address bus latches 10, signal line selector 12, data bus latches 14, test synchronizer 16, test pattern latches 18, address decoder 20, fault latches 22, and comparators 24. Asynchronous bus 26 is coupled to a microprocessor under test 27. Both the asynchronous bus 26 and the microprocessor under test comprise the device under test.

Address bus latches 10 are connected to asynchronous bus 26 by address bus 29 for latching the state of the bit pattern (address pattern) on the address bus 29, and by address valid line 30, which signifies that the state of the address bus is stable, and that the address is valid. Data bus latches 14 are connected to asynchronous bus 26 by data bus 34 for latching the state of the bit pattern (data pattern) on the data bus 34, by read/write line 36, and by data valid line 38. Read/write line 36 defines the data bus cycle as a read cycle, or as a write cycle. Data valid line 38 signifies that the state of the data bus is stable, and that the data on the bus is valid. Signal line selector 12 is connected to asynchronous bus 26 by address bus 29, and reset line 32. Signal line selector 12 is also connected to address bus latches 10 by address bus test enable line 11, and to data bus latches 14 by data bus test enable line 13. Signal line selector 12 will enable the output of either address bus latches 10, or data bus latches 14 to be transmitted to comparators 24, and to fault latch 22 through pattern under test bus 68. Reset line 32 acts to reset and initiate a system initialization sequence.

Test pattern latches 18 are connected to the test microprocessor 28 by test data bus 46, write line 48, and test data valid line 40. Test pattern latches 18 are further connected to comparators 24 by test pattern bus 54. Test microprocessor 28 sequentially feeds the test patterns over test data bus 46 to test pattern latches 18. Write line 48 enables test pattern latches 18 to latch the test pattern.

Fault latch 22 is connected to test microprocessor 28 by read fault line 60, fault pattern bus 62, and data valid line 64. Fault latch 22 is connected to asynchronous bus 26 by data valid line 38, address valid line 30, and read/write line 36. Fault latch 22 is also connected to address bus latches 10, and to data bus latches 14 by pattern under test bus 68. The read signal on read fault line 60 enables the faulty pattern under test to be read by test microprocessor 28. Address decoder 20 is connected to test microprocessor 28 by address bus 56 and test address valid line 58. Address decoder 20 will enable either test pattern latches 18 to latch the test pattern, or fault latch 22 to output the faulty pattern under test.

Test synchronizer 16 is connected to test microprocessor 28 by test data valid line 40, asynchronous bus 26 by data valid line 38 and address valid line 30, and comparator 24 by compare enable line 70. A compare enable signal are generated when test data valid line 40 and data valid line 38 is asserted, or when test data valid line 40 and address valid line 30 are asserted.

Comparator 24 is connected to address bus latches 10, data bus latches 14, and fault latch 22 by pattern under test bus 68. Comparator 24 is connected to test microprocessor 28 and to asynchronous bus 26 by ACK line 72, and to test microprocessor 28 by NAK line 74. The comparator compares the bit patterns from pattern under test bus 68 to the bit patterns from test pattern bus 54. When the patterns are identical, an ACK signal is generated and applied to asynchronous bus 26 and test microprocessor 28, completing the current bus cycle in both test microprocessor 28 and asynchronous bus 26 and allowing the initiation of the next bus cycle. This sequence will be repeated until all data sets have been successfully compared, rendering both the address paths and the data paths of the asynchronous bus, valid. However, when the patterns are not identical (indicating a possible failure in the interface logic of the device under test), a NAK signal is generated and applied to test microprocessor 28 only. This NAK signal initiates a diagnose sequence in test microprocessor 28. Since the last cycle that the asynchronous bus has performed is not acknowledge, it is not completed, and thus, all signal lines that participate in it are maintained in the asserted state. The faulty cycle is not allowed to be completed, the faulty state is not removed from the bus, and most importantly, the static debugging of the failure is made possible.

In operation, the state of address bus 29 (address pattern) and data bus 34 (data pattern) are latched by address bus latches 10 and data bus latches 14, respectively. Signal line selector 12 couples either address bus latches 10 or data bus latches 14 to the pattern under test bus 68, feeding the state of the signal lines as a bit pattern (either the address pattern or data pattern) to comparator 24 and to fault latch 22. The test pattern on test data bus 46 is latched to test pattern latches 18. Address decoder 20 enables either test pattern latch 18 to latch the test pattern, and feed it to comparator 24 over test pattern bus 54, or fault latches 22 to couple the bit pattern under test to test microprocessor 28 over fault pattern bus 62. When the bit pattern under test is identical to the test pattern, an ACK signal on line 72 allows test microprocessor 28 and asynchronous bus 26 to complete their cycles, and compare the next bit pattern to validate the full functionality of the address paths and the data paths of the asynchronous bus. When the bit patterns do not compare, the NAK signal on NAK line 74 initiates a diagnose sequence in the test microprocessor only. Since the cycle over asynchronous bus 26 is not acknowledged, the faulty cycle is not completed, and the state of the signal lines on asynchronous bus 26 is maintained in a static manner, at the time the failure is detected, and in the logic levels that caused the failure to occur.

By now it should be appreciated that there has been provided a test module for troubleshooting and diagnosing an asynchronous bus. This module provides for the testing of the interface logic to the asynchronous bus in real time and under normal operating speed. Faulty cycles are not allowed to be completed. When a failure is detected, the test modules causes the device under test to maintain its state in static levels. The address signals of the device under test are tested and verified to be operational before they are used to perform other tests. The test module controls the sequence of the test, and determines the validity of the test.

What is claimed is:

1. A test module for diagnosing an asynchronous microprocessor bus, said asynchronous microprocessor bus having a plurality of signal lines, and a microprocessor under test coupled to said asynchronous bus, comprising:
   a test microprocessor having a plurality of test patterns;
   first means coupled to said test microprocessor for sequentially latching said test patterns;
   second means coupled to said asynchronous bus for sequentially latching the state of said plurality of signal lines as a bit pattern;
   third means coupled to said asynchronous bus, said test microprocessor, said first means, and said second means, for comparing one of said bit patterns to one of said test patterns wherein a continue signal is supplied to said asynchronous bus and said test microprocessor when said test pattern and said bit pattern are the same, said continue signal causing said test microprocessor to supply another of said test patterns and said microprocessor under test to supply another of said bit patterns for comparison, and wherein a diagnose signal is supplied to said test microprocessor when said test pattern and said bit pattern are not the same; and
   fourth means coupled to said second means and said test microprocessor for transmitting said bit pattern from said second means to said test microprocessor when said diagnose signal is generated, whereby in absence of said continue signal said microprocessor under test maintains said diagnose signal causing the state of said bit pattern within said asynchronous bus, and said diagnose signal causes said test microprocessor to diagnose said bit pattern and provide an output.

2. The test module according to claim 1 wherein said second means comprises:
   a plurality of address latches coupled to said asynchronous bus, said third means and said fourth means, said plurality of address latches latching an address pattern as a first portion of said bit pattern;
   a plurality of data latches coupled to said asynchronous bus, said third means, and said fourth means, said plurality of data latches latching a data pattern as a second portion of said bit pattern; and
   a signal line selector coupled to said asynchronous bus, said plurality of address latches, and said plurality of data latches for enabling either said plurality of address latches or said plurality of data latches for selectively feeding said address pattern or said data pattern, respectively, to said third means and said fourth means.

3. The test module according to claim 2 wherein said first means comprises:
   a plurality of test pattern latches coupled to said test microprocessor and said third means;
   an address decoder coupled to said test microprocessor, said plurality of test pattern latches, and said fourth means, said address decoder either enabling said plurality of test pattern latches when said continue signal is generated or enabling said fourth means when said diagnose signal is generated.

4. The test module according to claim 3 wherein said third means comprises:
   a plurality of comparators coupled to said plurality of address latches, said plurality of data latches, said plurality of test pattern latches, said asynchronous bus, and said test microprocessor, for supplying said continue signal to said asynchronous bus and said test microprocessor when said bit pattern is the same as said test pattern, and supplying said diagnose signal to said test microprocessor when said bit pattern is not the same as said test pattern; and
   a test synchronizer coupled to said asynchronous bus, said test microprocessor, and said comparators, for supplying a compare enable signal to said comparators when a first signal is received from said asynchronous bus and a second signal is received from said test microprocessor, said first signal and said second signal indicating when said bit pattern and said test pattern, respectively, are available for comparison.

5. The test module according to claim 4 wherein said fourth means comprises a plurality of fault latches for latching said bit pattern and, when said diagnose signal is generated, feeding said latched bit pattern to said test microprocessor.

6. A method of diagnosing an asynchronous bus having a plurality of signal lines, said asynchronous bus coupled to a first microprocessor, comprising the steps of:
   latching the state of the signal lines as a bit pattern;
   latching a test pattern from a test microprocessor;
   comparing the bit pattern to the test pattern;
   generating a continue signal to the test microprocessor and the first microprocessor when the bit pattern is the same as the test pattern so that another bit pattern is compared to another test pattern;
   generating a diagnose signal to the test microprocessor when the bit pattern is not the same as the test pattern;
   said first microprocessor maintaining the state of the signal lines and preserving the bit pattern within the asynchronous bus in absence of the continue signal when the diagnose signal is generated; and
   diagnosing the preserved bit pattern by the test microprocessor when the diagnose signal is generated.

* * * * *